Figure 1:
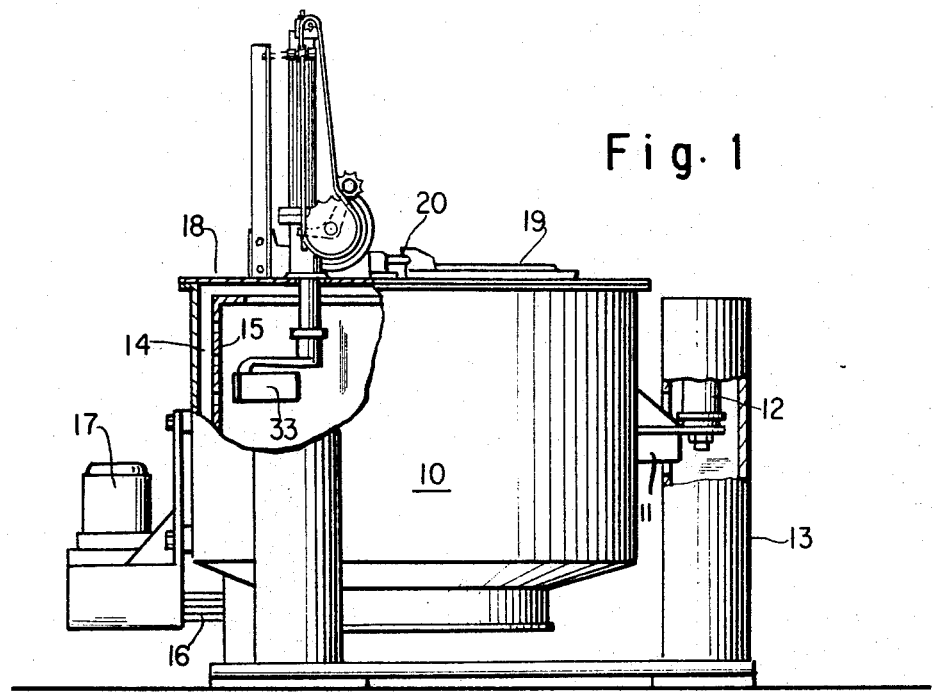

Oct. 18, 1966  F. O'CONOR  3,279,612
CENTRIFUGALS

Filed Nov. 10, 1964  4 Sheets-Sheet 1

INVENTOR.
FRANK O'CONOR.
BY
Robertson Smythe & Bryan
ATTORNEYS.

Oct. 18, 1966  F. O'CONOR  3,279,612
CENTRIFUGALS
Filed Nov. 10, 1964

INVENTOR.
FRANK O'CONOR
BY
ATTORNEYS.

Oct. 18, 1966     F. O'CONOR     3,279,612
CENTRIFUGALS
Filed Nov. 10, 1964     4 Sheets-Sheet 3
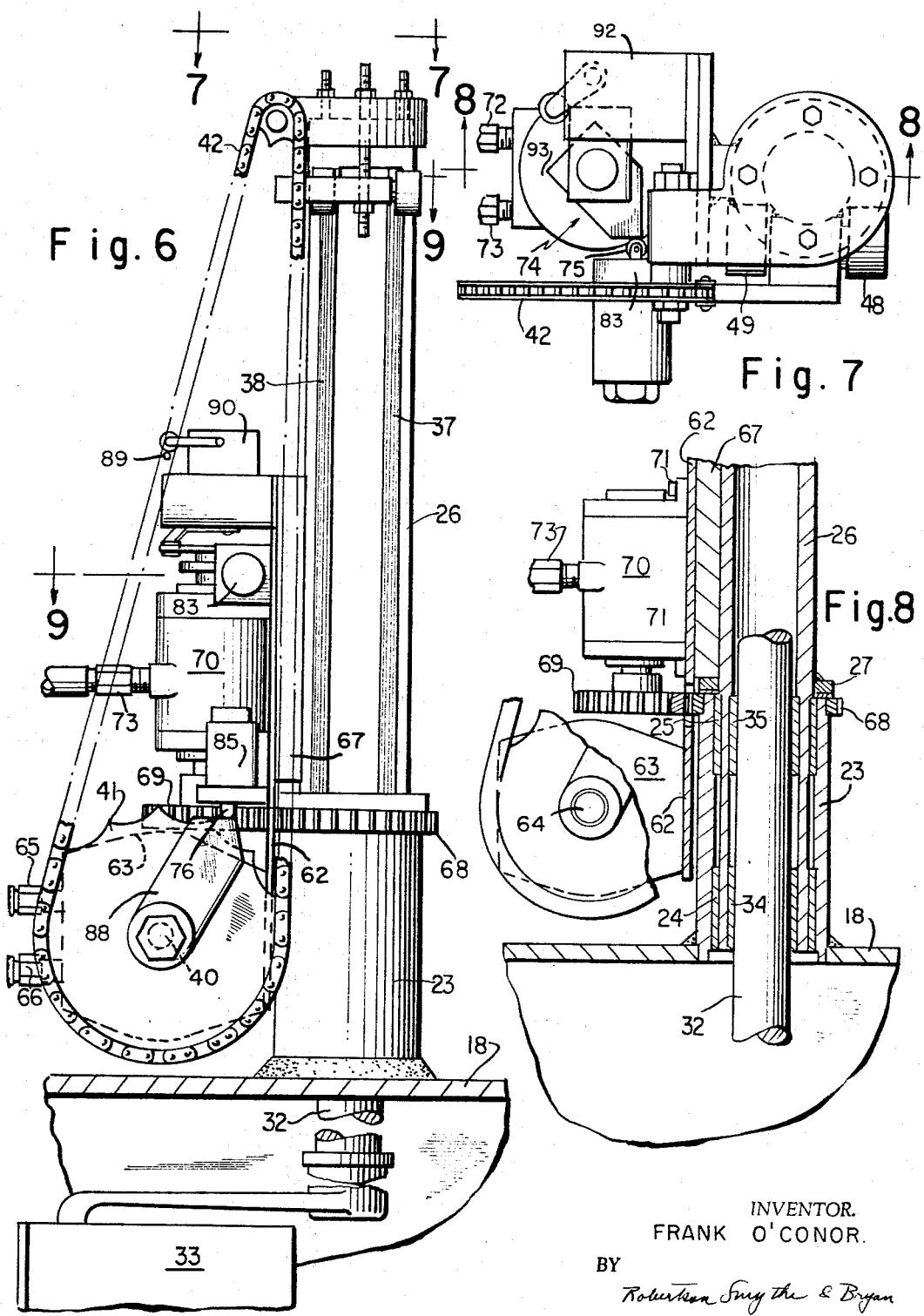
INVENTOR.
FRANK O'CONOR.
BY Robertson Smythe & Bryan
ATTORNEYS.

Oct. 18, 1966    F. O'CONOR    3,279,612
CENTRIFUGALS
Filed Nov. 10, 1964    4 Sheets-Sheet 4

INVENTOR.
FRANK O'CONOR
BY
Robertson Smythe & Bryan
ATTORNEYS.

United States Patent Office 3,279,612
Patented Oct. 18, 1966

3,279,612
CENTRIFUGALS
Frank O'Conor, Moline, Ill., assignor to Ametek, Inc., New York, N.Y., a corporation of Delaware
Filed Nov. 10, 1964, Ser. No. 410,118
4 Claims. (Cl. 210—375)

This invention relates to centrifugal separators and particularly to an improved unloading mechanism for centrifugal separators.

Prior known unloading mechanisms for centrifugal separators employ rack and pinion means that extend above the top of the centrifugal separator. Unless the rack is designed to remain outside of the separator, fumes from within the separator escape past it. When unloading devices are designed such that the rack remains outside of the separator, the mechanism extends an excessive distance above the top of the separator since the bar supporting the rack and plow must be twice the distance the plow is moved in removing cake from the separator basket side walls.

The principal object of this invention is to provide an unloading device for a centrifugal separator in which a completely effective seal can be made between the plow operating shaft that extends outwardly of the housing from the basket of the machine.

Another object of the invention is to provide such an unloading device that requires less space than prior known unloading devices.

Still another object of the invention is to provide such an unloading device in which the shaft that reciprocates and oscillates the plow has a cylindrical, uninterrupted surface throughout its entire extent.

Still another object of the invention is to provide such an unloading device of a design that produces less friction in its operation than prior known unloading devices.

A further object of the invention is to provide such an unloading device that is subjected to less vibration than prior known unloading devices.

Still another object of the invention is to provide such an unloading device that is manually or hydraulically operated.

In one aspect of the invention, a centrifugal separator may include a housing mounted on flexible supports attached to spaced standards so that the housing has limited oscillatable motion during operation. The housing may include a solid or perforated wall basket mounted on a spindle that extends to the outside of the bottom of the housing and on which a pulley is fixed. The pulley may be connected to a pulley on the output shaft of a driving motor supported by said housing. A case ring or cover may be provided on the top of the housing and it may include a door providing access into the interior of said basket.

In another aspect of the invention, a plow may be mounted within said basket for oscillatable movement into and out of engagement with the cake on the basket wall when it is desired to unload the basket. The plow also is adapted to be reciprocated to cover the full extent of the basket wall.

In another aspect of the invention, a rod comprising an uninterrupted cylinder throughout its length may have the plow fixed to its bottom end, and its other end may extend up through a passage in the housing cover. The rod may pass through cylindrical bearing sleeve means that effectively seals the inside of the housing from the atmosphere.

In a still further aspect of the invention, the sleeve through which the shaft extends may itself be journaled in a sealing fashion in a stationary tubular upright fixed to the housing cover. The sleeve may include means for permitting its oscillatory motion while restraining it from axial movement.

In still another aspect of the invention, the sleeve may extend up beyond the upper limit of the shaft to which the plow is connected and may have fixed to it a bracket for supporting a sprocket. A sprocket chain connects this sprocket to another one mounted at the lower end of the sleeve, the arrangement being such that oscillation of the sleeve will keep the two sprockets and chain in alignment.

In still another aspect of the invention, the sleeve may be cut away longitudinally throughout substantially its entire length, thereby exposing the plow shaft. The top of the plow shaft may support a bracket that extends outwardly through the cut-away portion of the sleeve, and may support trunnioned rollers in position to ride along the edge of the cut-away portion of the tube. A connection may be provided between the chain and bracket supporting the rollers so that rotation of the lower sprocket in both directions raises and lowers the plow shaft and consequently the plow within the basket.

In a still further aspect of the invention, means may be provided for rotating the sprockets and for oscillating the cut-away tube, which latter will transmit such forces through the roller assembly to the plow shaft as to force the plow into cake removal position and return.

In still another aspect of the invention, manual means may be employed to rotate the sprocket. It may comprise a handwheel on the shaft of the lower sprocket, which shaft is journaled in a bearing that is fixed to the cut-away tube. When the plow and plow shaft are very heavy, it is desirable to interpose a gear reduction between the handwheel and sprocket shaft. This lessens the turning effort required at the handwheel.

In still another aspect of the invention, separate hydraulic motor means may be employed to operate the sprocket chain and the oscillation of the plow shaft. These motor means may be combined in a hydraulic circuit for cyclic action.

The above, other objects and novel features of the invention will become apparent from the following description and accompanying drawings which are merely exemplary.

Figure 5:
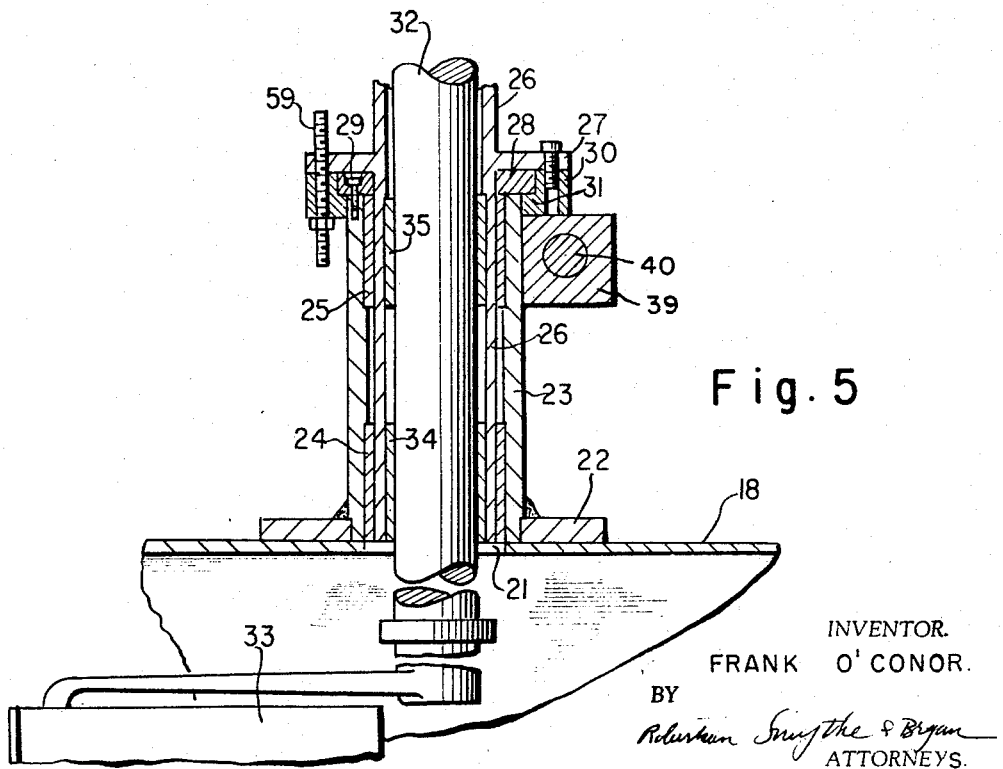
Figure 2:
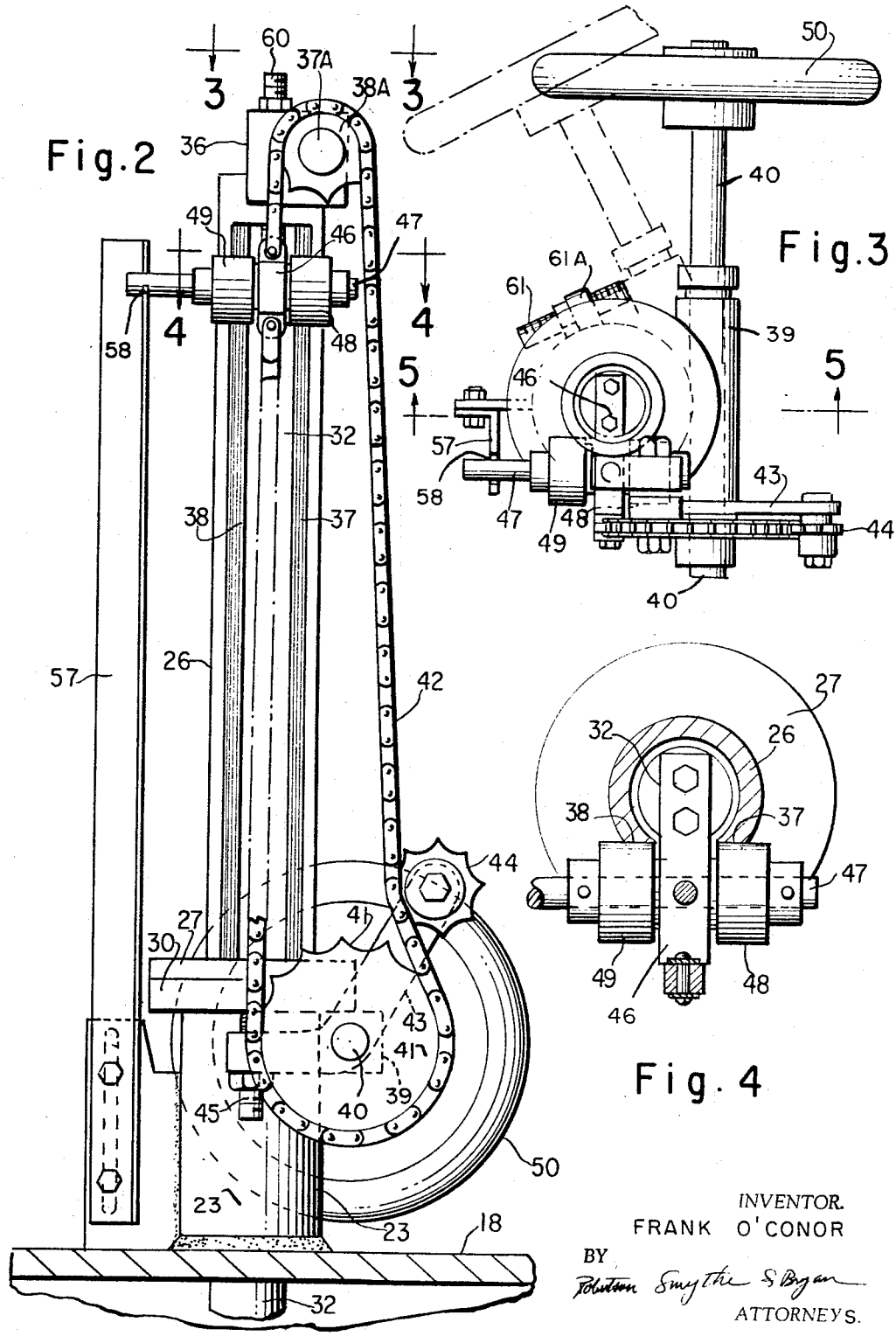
Figure 3:
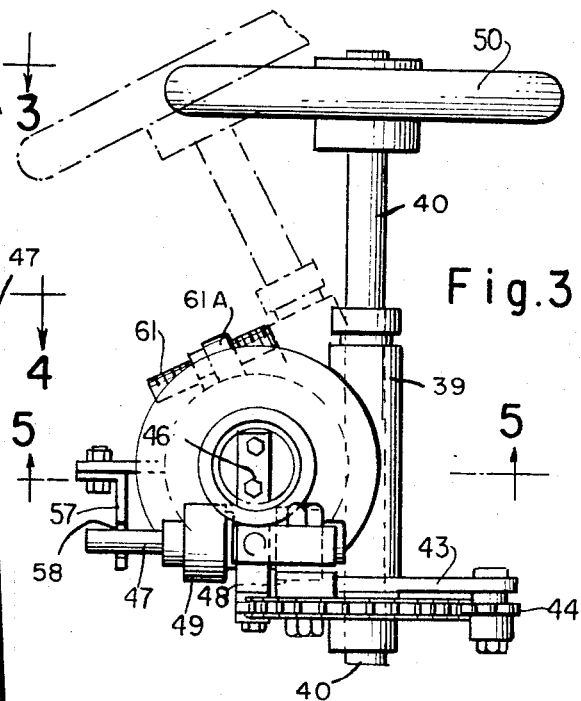
Figure 4:
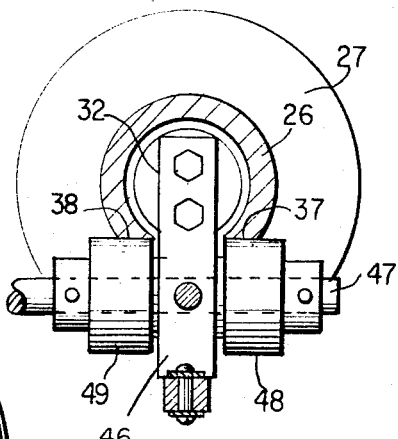
Figure 10:
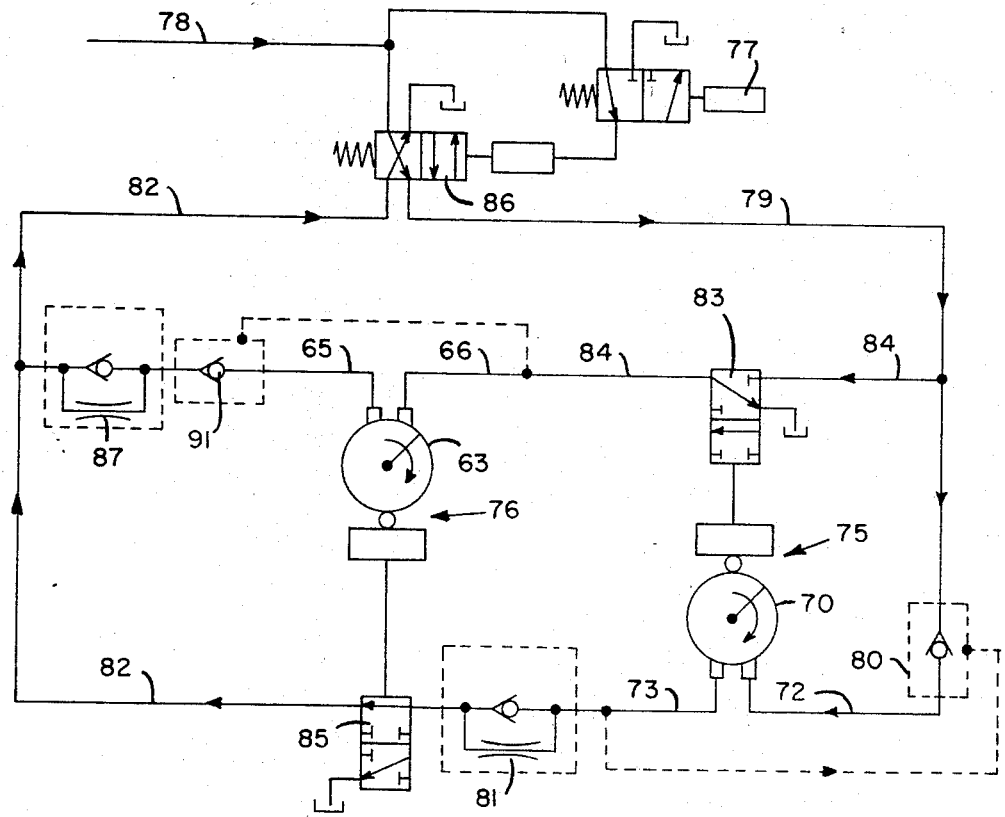
Figure 9:
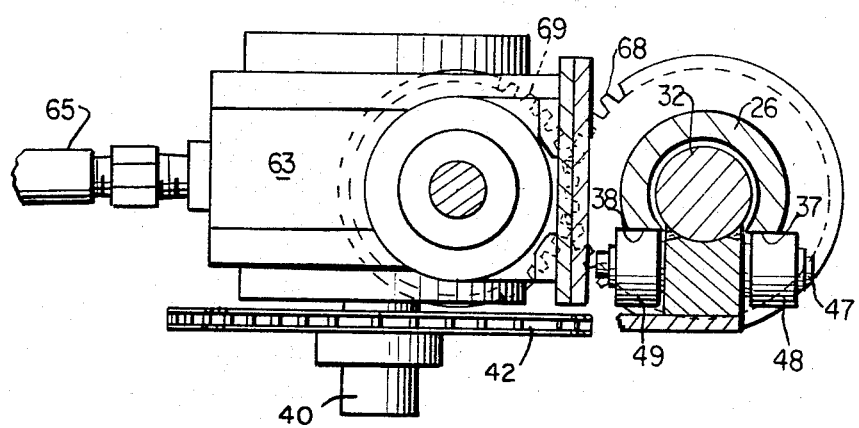

In the drawings:
FIG. 1 is an elevational view, partly in section, showing a centrifugal separator to which the principles of the invention have been applied;
FIG. 2 is an enlarged view of a certain portion of FIG. 1;
FIG. 3 is a view along line 3—3 of FIG. 2;
FIG. 4 is a sectional plan view taken substantially along line 4—4 of FIG. 2;
FIG. 5 is a sectional elevational view taken substantially along line 5—5 of FIG. 3;
FIG. 6 is an elevational view similar to FIG. 2, showing a modified form of the invention;
FIG. 7 is a plan view along line 7—7 of FIG. 6;
FIG. 8 is a sectional elevational view taken substantially along line 8—8 of FIG. 7;
FIG. 9 is a sectional plan view taken substantially along line 9—9 of FIG. 6; and
FIG. 10 is a hydraulic circuit for the species shown in FIGS. 6 to 9.

Referring to the drawings, and particularly to FIG. 1, the principles of the invention are shown as applied to a centrifugal separator including a housing 10 having brackets 11 at three equally spaced positions about housing 10, only one of which is shown in FIG. 1. The brackets 11 are connected to flexible suspension means 12 within hollow standards 13. The arrangement is such that during centrifuging, vibrations are absorbed by slight oscillatable motion of the housing 10 relative to the standards 13.

The housing 10 may include an open top, closed or spoked bottom basket 14 having side walls 15. The basket 14 may be attached to a spindle journaled in the housing 10, which latter may extend out through the bottom of said housing and may have a pulley thereon connected by belts 16 to a pulley on the output shaft of a drive motor 17.

Housing 10 may include a case ring 18 with means providing access to the interior of basket 14. Referring to FIG. 5, the case ring 18 includes a hole 21 therein over which a flange 22 is sealingly fixed to case ring 18. A tubular upright 23 is fixed to flange 22 and it includes bearings 24 and 25 within which a tubular element 26 is journaled for oscillatable motion while being restrained against axial movement.

The tubular element 26 includes an integral flange 27 that rests on a plate 28 at the top of, and fixed to the stationary tubular upright 23 by bolts 29. A ring 30 having an inturned flange 31 cooperates with plate 28 to prevent axial movement of sleeve element 26 while permitting oscillatory motion thereof.

A shaft 32 having an uninterrupted, cylindrical surface throughout its length may support, at its bottom end, a plow 33 of conventional design. Shaft 32 is journaled in plain bearings 34 and 35 in tubular element 26 in a manner to prevent leakage from the interior of the housing 10 to the atmosphere.

Referring to FIG. 2, the tubular element 26 extends upwardly and includes a bracket 36 at the top thereof. The element 26 is cut away along its length, exposing the shaft 32 and providing ways 37 and 38 along the cut-away portion (FIG. 4). Bracket 36 supports a shaft 37A on which is bushed a sprocket 38A. A bracket 39, fixed to ring 30, includes bearings for journaling a shaft 40 to which is fixed a sprocket 41 in the same vertical plane in which sprocket 38A is located. A chain 42 connects sprockets 38A and 41. A bell crank 43, pivoted on shaft 40, supports at the end of its one arm a rotatable chain tightening idler sprocket 44, and at the end of its other arm an adjusting screw 45 that reacts against flange 31 of ring 30. The construction is such that one flight of chain 42 is parallel with shaft 32 and adjacent to, and parallel with, the cut-away portion of the tubular element 26.

Referring to FIG. 2, the top of shaft 32 supports a bracket 46 that extends out through the edges 37 and 38 defining the cut-away portion of tubular element 26. The bracket 46 supports a bearing journaling a shaft 47 on which are located guide rollers 48 and 49 adapted to ride along edges 37 and 38 of the cut-away portion of element 26. A plate fixed to the bearing supporting shaft 47 is fixed to the flight of chain 42 that is parallel with shaft 32. The shaft 40 has a handwheel 50 fixed to it. Accordingly, rotation of the handwheel will raise and lower shaft 32 and with it, plow 33.

In order to manually oscillate plow 33 from a position away from, to a position adjacent to the inner surface of the perforated wall in order to remove cake therefrom, it is only necessary to grasp the handwheel 50 and pull the bracket 39 together with element 26 about the axis of shaft 32 until bracket 39 abuts an adjustable set screw 61 threaded into a bracket 61A on tubular upright 23. The torque thus applied to tubular element 26 is transmitted through rollers 48, 49 and bracket 46 to shaft 32, thereby turning plow 33 in the desired fashion.

When the plow 33 is in its retracted upper position, it may be supported by a notch 58 at the top of a standard 57, the latter being welded or otherwise fastened to upright 23. Shaft 47 supporting rollers 48, 49 may be of sufficient length to cooperate with notch 58 when the shaft 32 is raised to its upper position and turned by pulling handwheel 50 arcuately to move plow 33 away from the wall 15 of basket 14.

Referring to FIG. 5, a set screw 59 is mounted on flange 27 in line with bracket 46 and is adjusted so that when bracket 46 strikes it, it stops the downward movement of shaft 32 so that plow 33 does not strike the bottom of basket 14.

Referring to FIG. 2, a set screw 60 is mounted in alignment with bracket 46 and it is adjusted to abut bracket 46 to limit upward movement of shaft 32 so that plow 33 does not hit the top ring of basket 14.

Referring to the embodiment shown in FIGS. 6 to 9, inclusive, parts shown therein which are the same as those shown in FIGS. 1 to 5 will bear the same reference numerals.

In this embodiment, the operation of the chain 42 and oscillation of tubular element 26 are effected by hydraulic torque motors of the stall type. Referring to FIGS. 6 and 8, a plate 62 supports a hydraulic torque motor 63, the output shaft 64 of which is connected to shaft 40 supporting sprocket 41. Lines 65 and 66 supply pressure liquid to motor 63. The plate 62 extends downwardly along another plate 67 that is welded or otherwise fastened to flange 27 of tubular element 26.

Referring to FIG. 8, a spur gear 68 is fixed to stationary upright 23 and it meshes with a spur gear 69 on the output shaft of another hydraulic stall type torque motor 70 that is attached to plate 67 by bolts 71 that pass through plate 62. Lines 72 and 73 (FIG. 7) supply pressure liquid to motor 70. Cam means 74 and 88 are provided for operating valve actuators 75 and 76 for controlling a cycle of operation of the two motors 63 and 70 so that plow 33 follows a predetermined path of travel.

Referring to FIG. 10, the energizing of a solenoid 77 causes supply pressure liquid from a line 78 to flow through a line 79 past a check valve 80, through line 72, motor 70, line 73, restrictor 81, line 82 to tank. This rotates plow blade 33 toward the wall of basket 15 until stopped by a preset abutment. When it has reached its cake removal position, cam means 74 actuates valve actuator 75 to reverse a valve 83, causing pressure fluid in line 79 to flow through line 84 into motor 63 to move plow 33 downwardly until it reaches the bottom of its stroke. When plow 33 starts toward its bottom position, cam means 88 operates valve actuator 76 to reverse valve 85, blocking line 82 and draining line 73 to tank. When the plow has discharged the solids from the basket and reached its lowest position, an extended chain pin 89 has traveled to a point where it will actuate a limit switch 90. Limit switch 90 then actuates a timer in the electric control circuit to provide a few seconds delay before de-energizing the solenoid valve 77 to shift the port connections on 4-way valve 86. With valve 86 shifted, pressure liquid from line 78 is directed through line 82, restrictor valve 87 and reversely rotates motor 63, raising plow 33 to its upper position. The liquid passes through line 84, valve 83, line 79 to tank. When plow 33 is again at its upper position, cam means 88 operates valve actuator 76 to return valve 85 to the position shown, permitting pressure fluid to flow through line 73, motor 70, line 72 to rotate plow 33 toward the spindle axis of basket 15.

The restrictor valves 81 and 87 are combination needle and check valves which offer free flow in one direction and metered flow in the opposite direction. As used in this circuit, they provide free flow in the direction of pressure and meter the exhaust from the hydraulic torque motors. Thus, restrictor valve 81 meters the exhaust from motor 70 to control the speed of the plow 33 when it rotates towards the basket wall, and restrictor valve 87 meters the exhaust from motor 63 to control the speed of the plow 33 when it moves down the basket wall.

Pilot check valve 91 in line 65 blocks this line to prevent the plow from dropping due to its own weight during the time the plow is rotating towards the basket wall. After valve 83 has been actuated to supply hydraulic pressure to line 84, this pressure will be applied to the pilot connection of valve 91, opening it and allowing exhaust from motor 63 to be metered through valve 87 to tank.

Pilot check valve 80 in line 72 blocks flow in this line during the time the plow is moving upward. By blocking line 72 during this time, the plow is prevented from moving away from the basket wall due to the action of any material that might have been left in the basket. If the plow 33 were allowed to rotate away from the basket wall during the upstroke of the plow, valve 83 could be shifted to a center position so all its ports would be blocked. If this happened, the plow could not return to its idle position.

Limit switch 92, which is actuated by cam 93, can be wired in the electric control circuit to prove the position of the plow 33, away from the basket wall, at the conclusion of the plowing operation and before the balance of the operating cycle is initiated.

Although the various features of the improved plow operating means for centrifugal separators have been shown and described in detail to fully disclose two embodiments of the invention, it will be evident that changes may be made in such details and certain features may be used without others without departing from the principles of the invention.

What is claimed is:

1. In a centrifugal separator, a housing; a basket having side walls mounted within said housing for rotation; a case ring mounted on the top of said housing; a stationary tubular upright mounted on said case ring overlying a hole therein; a shaft journaled in bearings within said upright for rotational oscillatable motion as well as reciprocable motion, said shaft having an uninterrupted cylindrical surface throughout substantially its entire length; a plow at the lower end of said shaft within said basket; a tubular element surrounding said plow shaft, extending upwardly beyond the upper position of said plow shaft and mounted on said stationary upright for rotational oscillatable motion but restrained against reciprocable motion, said tubular element being cut away, exposing said shaft; a sprocket and chain drive mounted along said tubular element; guide means connected to the top of said plow shaft; means connecting said guide means to said chain so that said guide means rides on the edges of said tubular element formed by the cut-away portion; means for operating said chain drive; and means for rotationally oscillating said tubular element.

2. In a centrifugal separator, a housing; a basket having side walls mounted within said housing for rotation; a case ring mounted on said housing; a stationary tubular upright mounted on said case ring overlying a hole therein; a shaft journaled in bearings within said upright for rotational oscillatable motion as well as reciprocable motion, said shaft having an uninterrupted cylindrical surface throughout substantially its entire length and forming a seal as it passes through said bearings; a plow at the lower end of said shaft within said basket; a tubular element surrounding said plow shaft, extending upwardly beyond the upper position of said plow shaft and mounted on said stationary upright for rotational oscillatable motion but restrained against reciprocable motion, said tubular element being cut away, exposing said shaft; a sprocket and chain drive mounted along said tubular element; roller means connected to the top of said plow shaft; means connecting said roller means to said chain so that said roller means rides on the edges of said tubular element formed by the cut-away portion; gear means surrounding and fixed to said stationary tubular upright; rotatable gear means mounted on said tubular element meshing with said stationary gear means; means for operating said chain drive; and means for rotating said rotatable gear means.

3. In a centrifugal separator according to claim 1, wherein said sprocket and chain drive includes sprockets mounted adjacent the extremities of said tubular element and said chain and guide means are movable lengthwise of said tubular element.

4. In a centrifugal separator according to claim 3, wherein said sprockets are journalled in bearings adjacent the extremities of said tubular element so that one flight of said chain is substantially parallel with said shaft and said cut-away portion of said tubular element.

References Cited by the Examiner

UNITED STATES PATENTS 2,467,023  4/1949  Foster et al. _____ 210—375

REUBEN FRIEDMAN, *Primary Examiner.*

J. L. DECESARE, *Assistant Examiner.*